April 6, 1954     C. R. PATON     2,674,329
MOTOR VEHICLE POWER PLANT AND RESILIENT MOUNTING THEREFOR
Filed Aug. 2, 1950     3 Sheets-Sheet 1

INVENTOR.
CLYDE R. PATON.
BY
Wallace P. Lamb
ATTORNEY

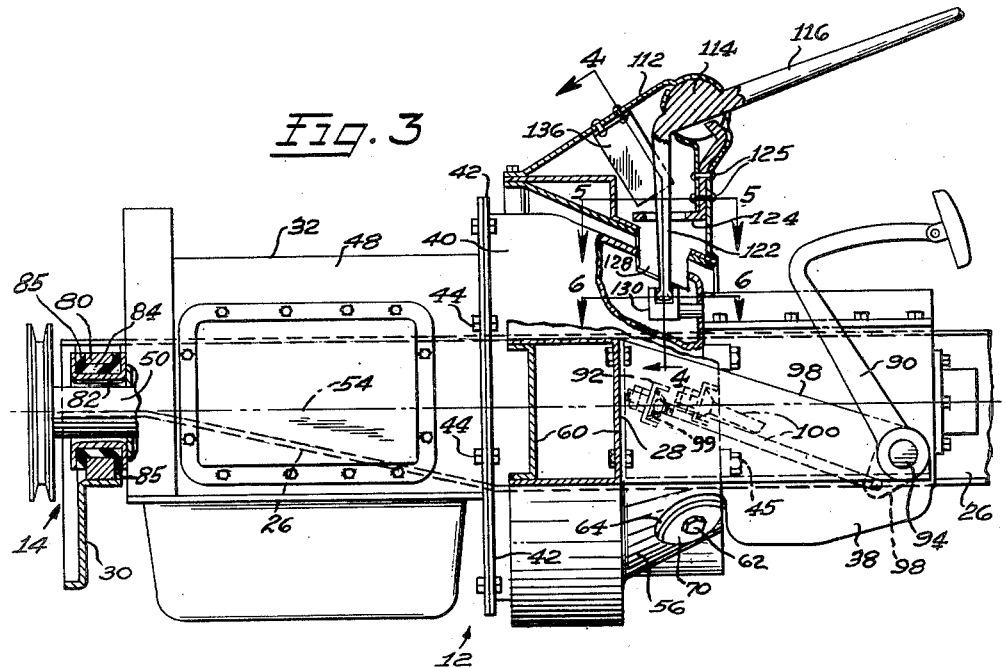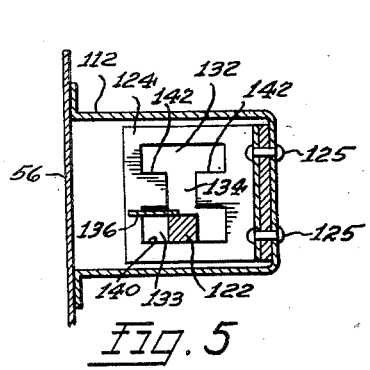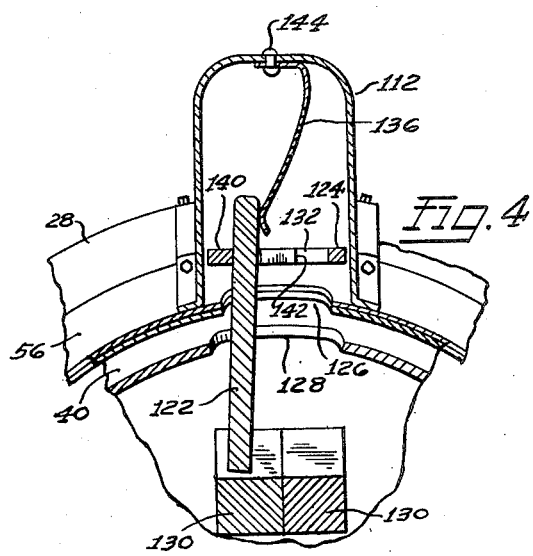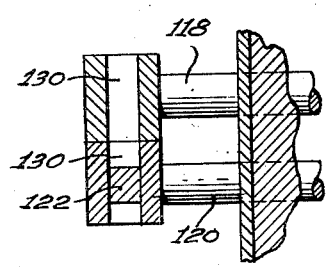

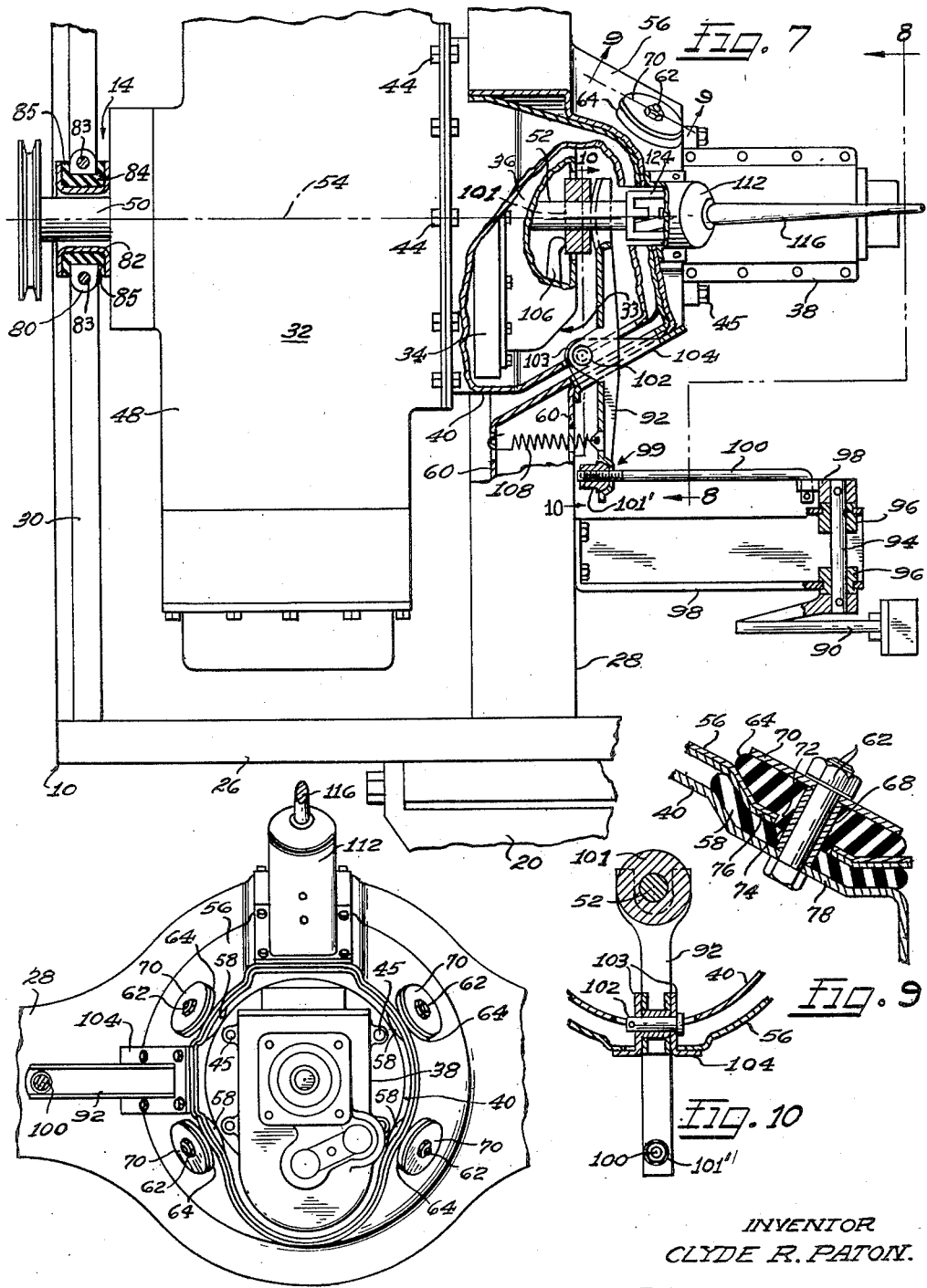

Patented Apr. 6, 1954

2,674,329

UNITED STATES PATENT OFFICE 2,674,329

MOTOR VEHICLE POWER PLANT AND RESILIENT MOUNTING THEREFOR

Clyde R. Paton, Birmingham, Mich.

Application August 2, 1950, Serial No. 177,321

1 Claim. (Cl. 180—64)

This invention relates generally to motor vehicles and more particularly to power plant mountings therefore.

It is an object of the present invention to provide an improved arrangement of a motor vehicle power plant, chassis frame and power plant mountings to dampen power plant vibrations and generally enhance riding qualities of a motor vehicle.

Another object of the invention is to provide an improved arrangement of a motor vehicle oscillatory power plant and resilient mountings therefor to effect a sufficiently low, natural oscillatory frequency as to avoid resonance with torque reaction frequencies occurring within attainable operating speeds of the power plant.

Another object of the invention is to provide an improved arrangement of a motor vehicle oscillatory power plant and resilient mountings therefor so that the power plant acts to absorb the torque impulse reactions produced by itself.

Another object of the invention resides in the mounting of an oscillatory power plant and a control or shift gear lever therefor on a common support in a manner so that movement of the power plant relative to said support will not be transmitted to the control or shift gear lever.

Another object of the invention is to mount an oscillatory power plant and control or clutch operating lever on a common support without transmission of movement of the power plant to the control or clutch pedal.

Another object of the invention is to provide an improved arrangement of a shift gear lever and a clutch operating lever such that said levers may be readily assembled with and/or disassembled from their respective mechanisms without disturbing the latter.

A further object of the invention is to provide an improved compact arrangement of an oscillatory power plant, clutch and shift gear operating mechanisms on a motor vehicle chassis.

Other objects and advantages of the invention will become apparent from the following detailed description taken in connection with the accompanying three sheets of drawings in which:

Fig. 3 is a side view of the vehicle power plant with parts broken away and in section to show certain details of construction;

Fig. 4 is a vertical sectional view of the transmission gear shift mechanism, taken along the line 4—4 of Fig. 3;

Fig. 5 is a horizontal sectional view of the gear shift mechanism, taken along the line 5—5 of Fig. 3;

Fig. 6 is a horizontal sectional view of the gear shift mechanism, taken along the line 6—6 of Fig. 3;

Fig. 7 is an enlarged, fragmentary plan view of the front end of the vehicle chassis with parts broken away and in section;

Fig. 8 is an end elevational view of the vehicle power plant taken in the direction of the arrows 8—8 of Fig. 7;

Fig. 9 is an enlarged sectional view of a power plant mounting, taken along the line 9—9 of Fig. 7; and Fig. 10 is a sectional view of clutch operating mechanism, taken along the line 10—10 of Fig. 7.

Figure 1:
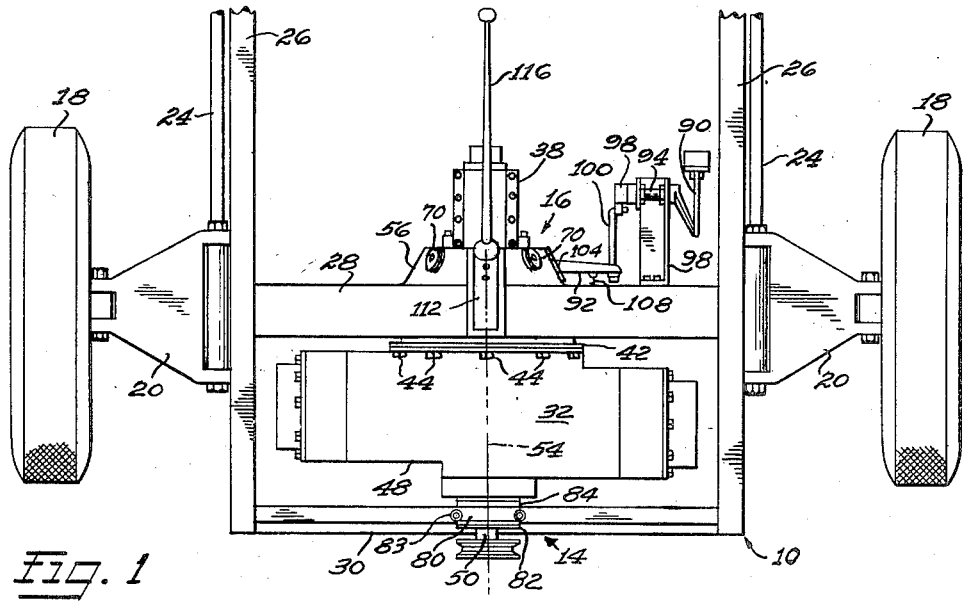
Fig. 1 is a fragmentary plan view of the front end of a motor vehicle chassis, embodying features of my invention.
Figure 2:
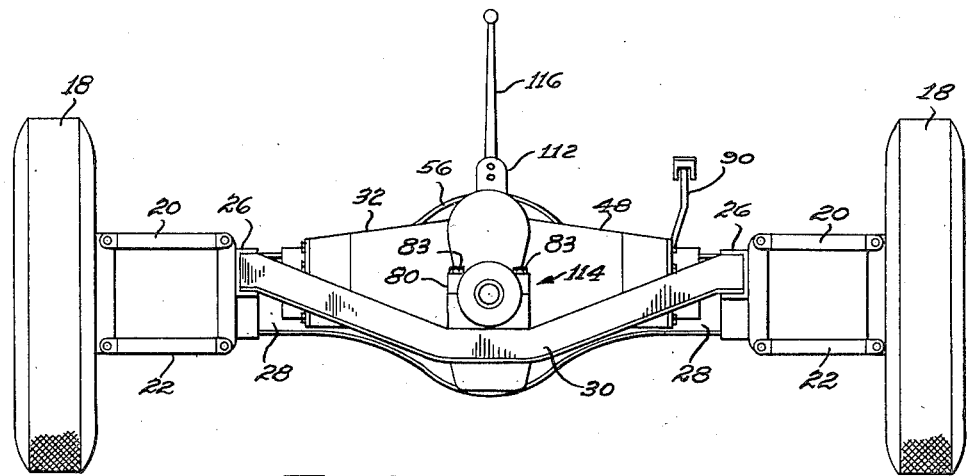
Fig. 2 is a front view of the motor vehicle chassis of Fig. 1.

In the drawings, the motor vehicle illustrated comprises, in general, a supporting means or chassis frame 10, an oscillatory power plant 12, a power plant front mounting 14 and a power plant rear mounting 16. The power plant 12 is supported for rocking or oscillatory movement on the front and rear mountings 14 and 16 respectively, which in turn are supported on the vehicle frame 10. In the present arrangement, the power plant 12 is located adjacent the front end of the vehicle frame, but may be located elsewhere along the frame, if desired.

A pair of front steerable ground wheels 18 may be individually suspended from opposite sides of the frame 10 by wheel suspension mechanisms, including upper and lower arms or links 20 and 22 respectively. Any suitable type of wheel suspension mechanism may be used, the type shown in the drawings having torsion bars 24 extending longitudinally of the frame 10, yieldably restraining pivoting of the wheel suspension links 20, 22. The wheel suspension mechanisms are not herein shown or described in detail, since such mechanisms are well known in the motor vehicle art and since they form no part of the present invention.

The chassis frame 10 comprises a pair of laterally spaced, longitudinal frame members 26, a main cross member 28 and a front cross member 30. These frame members 26, 28 and 30 may be welded, bolted or may be otherwise suitably secured together to provide a rigid frame. The main cross member 28, connecting the front ground wheels 18 together, is located in alignment with, or is in substantially the same vertical plane as the axes of the wheels 18, providing for a compact arrangement of the power plant 12, as will hereinafter be seen.

The power plant 12 comprises, in general, an engine 32, a power transmitting coupling or clutch 33, and a power transmission gear mechanism in a housing 38. These units may be arranged in line from the front toward the rear of the vehicle, in the order named. As shown, the power plant 12 is arranged with the engine 32 thereof disposed between the front and main cross members 28, 30; the clutch 33 disposed within the main cross member 28; and the transmission gear mechanism disposed rearwardly of the main cross member 28 whereby to effect a low, compact arrangement of the power plant units. The clutch mechanism 33 includes the usual clutch driving member or flywheel 34 and a clutch mechanism casing 36.

A power plant rear trunnion 40, in the form of a clutch housing, is disposed intermediate the engine 32 and the gear transmission housing 38; the trunnion 40 surrounding and enclosing the clutch 33. At its front end, the trunnion 40 may have an outturned flange 42 bolted, as at 44, securely to a similar flange on the rear end of the engine 32 and at its rear end, the trunnion 40 may be bolted, as at 45, securely to the front end of the transmission housing 38. Preferably, the trunnion 40 is made generally frustro-conical in shape, tapering inwardly from front to rear thereof.

As shown, the engine 32 is of the opposed cylinder type having an elongated cylinder block 48 extending lengthwise transversely of the chassis frame or extending longitudinally of the frame cross members 28, 30. The engine driving or crankshaft, as at 50, extends longitudinally of the chassis frame for coupling by the clutch 33 to a driven or clutch shaft 52 of the gear transmission mechanism in housing 38.

In order to decrease or dampen engine vibrations efficiently, the power plant front and rear mountings 14 and 16 are arranged with respect to the axially aligned driving shaft 50 and driven shaft 52 so that the power plant axis of oscillation coincides or substantially coincides with the axes of rotation of these shafts. The common axes of the engine driving shaft 50, clutch driven shaft 52 and power plant mountings 14, 16 are represented by the dot and dash line, designated by numeral 54. This axis 54 is preferably principally horizontally disposed or is disposed at a small angle to the horizontal. Thus, it will be seen that the power plant oscillates substantially about its own driving and driven shafts' axes which effects a substantially balanced condition of the power plant. Also, the center of gravity of the power plant is preferably on or near the axis of oscillation of the power plant. It should be noted that the driving and driven shafts of the power plant do not oscillate, since the power plant oscillates substantially about the shaft axes as a center. By this arrangement, the mounting is such as to insure a low natural frequency of oscillation of the power plant below usably attainable operating torque reaction frequencies of the power plant.

The power plant rear mounting 16 includes a trunnion support 56 and a plurality of resilient vibration insulators or dampeners 58. As shown, I mount the trunnion support 56 securely on or integral with the frame main cross member 28 and interpose the resilient mounting members 58 between the trunnion support 56 and the trunnion 40. In the present construction and arrangement, the trunnion support 56 is disposed substantially midway between the ends of the cross member 28 and extending rearwardly therefrom surrounds or receives the clutch-flywheel housing or trunnion 40 in spaced relation thereto; the trunnion support 56, like the trunnion 40, being of general frustro-conical shape. As shown, the axes of the frustro-conical portions of support 56 and the power plant trunnion 40 therein are substantially coincident with each other and with the axis of oscillation of the power plant or are substantially coincident with the axis of rotation of the engine driving and driven shafts. The frustro-conical trunnion support 56 tapers inwardly and rearwardly substantially coextensive with the housing 40, the rear end of the trunnion 56 being open, as shown in Fig. 8, so that the gear transmission housing 38 may be bolted or be otherwise suitably secured to the adjacent, exposed rear end of the trunnion 40. This trunnion support 56 may be integral with webs 60 of a pair of channel members which are secured together, preferably by welding to form the cross member 28. The resilient mounting members 58, preferably rubber pads, are spaced radially and substantially equally distant from the axis of oscillation of the power plant in a plane transversely of the axis of oscillation of the power plant. For best results, I locate the rubber mounting members 58 adjacent the rear or small end of the conical trunnion support 56, as close as possible to the axis of oscillation of the power plant to obtain a low, natural torque reaction frequency for oscillation of the power plant on its mountings. Because of the need to provide for greater values of unbalance at the rear of the engine due to difficulties of insuring against static and particularly dynamic unbalance occurring in the region of the clutch and flywheel, I arrange the rubber mounting members 58 such that the faces thereof are in planes angularly disposed longitudinally of the driving shaft axis so that the mountings are partially under shear and partially under compression when the power plant oscillates. Each of the rubber mounting members 58 is held under compression in engagement with opposed conical surfaces of the housing 40 and trunnion support 56 by a securing element, preferably a bolt and nut 62 which may be insulated from the trunnion support 56 by an outer rubber mounting member or pad 64 held by the bolt and nut against the outer surface of the trunnion support 56 (see Fig. 9). A metal sleeve 68 is preferably provided through which the bolt extends, the sleeve 68 serving to limit tightening down of the nut to limit correspondingly, displacement of the rubber mounting members 58 and 64. The inner end of the sleeve 68 abuts the outer surface of the trunnion 40 and the outer end of the sleeve abuts a large, metal backing plate or washer 70 against which the nut is tightened down. A large clearance hole 72 is provided in the trunnion support conical wall to receive a central, extended sleeve portion 74 of the rubber pad 64 so that there will be no metal-to-metal contact between the parts. Preferably, the trunnion 40 and the trunnion support 56 have inwardly recessed or dished portions 76 and 78 respectively to receive the rubber mountings 58 and the insulating, mounting pads 64. These mounting member recesses 76, 78 are conical in shape and aid in restraining the rubber mounting members. Also, the mounting member recesses 76, 78 allow the mounting members 58 to be positioned closer to the axis of oscillation of the power plant. It will be seen that when the power plant oscillates, the resilient mounting members 58 and 64 will be under combined shear and compression to restrain such movement and that the mounting members 58, 64 will be largely under shear for movements of low amplitude and under increasing percentage of compression as amplitudes increase.

Referring now to the power plant front mounting 14, this mounting comprises, in general, a trunnion support 80, a hollow trunnion or stub shaft 82 and a resilient mounting member 84. As shown, the trunnion support 80 is mounted on the frame front cross member 30; the trunnion 82 being rigidly secured to the front of the engine and the resilient mounting member 84 being interposed between the trunnion and its support 80. The trunnion support 80 has a two-part or split bearing of which one or the lower part is rigidly secured to the cross member 28 and the upper part is secured to the lower part by bolts 83. This trunnion bearing, the trunnion 82 and the resilient mounting member 84 are concentric with each other and with the axis of rotation of the engine crankshaft 50. The trunnion 82 is of general tubular shape having outturned end flanges, one of which may be welded or be otherwise suitably secured to the front of the engine surrounding the projecting end portion of the engine driving shaft 50 in spaced relation thereto. The resilient mounting member 84 may be made of rubber or similar composition of tubular shape, similar in shape to the tubular trunnion 82 which it surrounds. Preferably the rubber mounting member 84 is provided with opposite, outturned end flanges 85 which respectively engage the inner, opposed side surfaces of the trunnion end flanges. When the upper part of the trunnion bearing is drawn down and secured to the lower part of the trunnion support, the rubber mounting member 84 is displaced or placed under pressure to effect a bond-like relationship with the trunnion bearing and trunnion. Thus, when the power plant oscillates, the rubber mounting member 84 will be largely under shear. The mounting arrangement of both front and rear mountings 14 and 16 respectively is such that the rubber mounting members thereof is less restraining to oscillation of the power plant than to radial movement of the power plant relative to the frame and offers greatest resistance to axial or fore-and-aft movement of the power plant.

The power transmitting coupling or clutch in housing 36 is operated by mechanism including a foot pedal lever 90 and a power plant control member or clutch operating lever 92. In order that the clutch operating mechanism may be assembled with the chassis prior to mounting the vehicle body on the chassis to facilitate vehicle assembly, I mount the levers 90 and 92 on the chassis frame, but arrange them in a manner such that oscillatory motion of the power plant is not transmitted to the clutch or to its operating mechanism. To this end, the clutch pedal lever 90 is pivotally supported on a transverse shaft 94, mounted in spaced bearings 96 on a bracket 98 which is rigidly secured to the frame cross member 28. On the other end of the shaft 94 from the foot pedal clutch lever 90 is secured a lever or arm 98 which is connected by a universal connection 99 to the outer end of the clutch operating lever 92 by a link 100. The universal connection 99 may comprise an adjusting nut 101′ screwthreaded onto the link 100 having a rounded end engaging in a socket in the end of the lever 92 (see Fig. 7). The clutch operating lever 92 is pivoted intermediate its ends on a pivot pin 102, supported in ears 103 of a bracket 104 which is secured to the side of the conical trunnion support 56 of the power plant rear mounting. This pivot pin 102 is arranged so that the clutch operating lever 92 is substantially in a plane normal to the clutch shaft axis and substantially radial to the axis of oscillation of the power plant. As illustrated in Fig. 3, the universal connection 99 allows the clutch operating lever 92 to pivot about pin 102 in the aforementioned plane, normal to the axis 54 of oscillation of the power plant. An inner arm of the control member or clutch operating lever 92 extends into the power plant trunnion or housing 40 to engage and move a slidable sleeve or clutch release bearing 101 along the driven shaft 52 to operate the usual clutch throwout levers 106. Large clearance openings are provided in the sides of the trunnion 40 and trunnion support 56 for the lever 92. As shown more clearly in Fig. 10, the inner end of the clutch operating lever 92 is bifurcated to straddle and clear the driven shaft 52. A return coil spring 108 is provided having one end thereof attached to the outer arm of the clutch operating lever 92 and the other end attached to the frame cross member 28. From the above description it will now be seen that since the power plant oscillates about its own driving and driven shafts that such motion will not be transmitted to the clutch operating lever 92 and consequently will not be transmitted to the clutch pedal lever 90.

Like the clutch operating mechanism, gear shift mechanism is mounted on the chassis frame 10 so as to be included in the chassis assembly prior to assembly of the chassis and body of the vehicle; the gear shift mechanism being arranged so that oscillatory movement of the power plant is not transmitted thereto. This gear shift mechanism has a supporting member or cap 112 which is mounted on and rigidly secured to the top of the trunnion support 56, substantially midway between the ends of the frame cross member 28. Supported in a ball socket in the cap 112 is a ball 114 of a power plant control member or gear shift lever 116, operable to select and slide one or the other of a pair of gear shifter rails 118 and 120 to shift gears (not shown) in the power plant transmission housing 38. A lower arm 122 of the gear shift lever 116 extends downwardly through a gate 124 and through clearance openings 126 and 128 in the trunnion support 56 and trunnion 40 respectively to engage in one or the other of a pair of transverse, upwardly facing slots or sockets 130 provided in the shifter rails 118, 120. The shifter rails 118, 120, extend rearwardly from the transmission casing into the clutch housing inwardly of the mountings 58 to engage with the shift lever sockets 130 in substantially the same transverse vertical plane as the mounting means. The gate 124 and part of the shift lever ball socket is rigidly secured in and to the cap 112, preferably by rivets 125. An opening in the gate 124, receiving the shift lever arm 122 is in the general shape of an H having spaced parallel slots 132, 133 connected by a transverse slot 134 for passage of shift lever arm 122 from one to the other of slots 132, 133. A tensioned leaf spring 136 is provided to urge the lever arm 122 in one direction against the edge 140 of the gate slot 133. In Fig. 5, the gear shift lever arm 122 is shown in neutral position held against the slot edge 140 of the gate slot 133 by the spring 136. From this neutral position, rearward movement of the shift lever arm 122 causes shift to be made to second or intermediate gear and forward movement of lever arm 122 in slot 133 causes shift to be made to high gear in the well-known manner. When the shift lever arm 122 is moved across into slot 132 and moved forward, shift is made to low gear and when it is moved rearwardly shift is made to reverse gear. When the gear shift lever arm 122 is in the low and reverse gear slot 132 of the gate 124, the tension spring 136 holds the shift lever arm 122 against slot edges 142, to prevent accidental movement of the shift gear lever out of gear position. As shown in Figs. 3 and 4, the spring 136 may be secured adjacent its upper end to and within the gear shift cap 112 by rivets 144. It will be seen that the above-described arrangement including the lower gear shift lever arm 122 engaging loosely in transverse slots or sockets 130 of the shifter rails 118, 120, prevents transmission of oscillation movement of the power plant to the shift gear lever 116.

From the foregoing description it will be seen that I have provided an improved arrangement of a power plant and resilient mountings therefor to absorb substantially entirely, vibrations induced by the firing of power plant engine cylinders. By my arrangement in which the power plant is free to oscillate about an axis substantially coincident with the engine driving or crankshaft axis, it will be appreciated that the engine mountings have a low, natural frequency below usably attainable torque reaction frequencies of the engine. This gives efficient vibration absorption at and by the mountings so that no appreciable vibration is transmitted to the vehicle frame. Also, I have provided an improved arrangement between an oscillatory power plant, and clutch and shift gear operating levers to prevent transmission of movement of the power plant to the levers without need of lost motion or other corrective compensating means.

Although a preferred form of the invention has been illustrated and described in detail, it will be apparent to those skilled in the art that various modifications may be made therein without departing from the spirit of the invention or from the scope of the appended claim.

I claim:

In a motor vehicle, a frame cross member having an opening therethrough, an engine on one side of said cross member, a transmission housing on the other side of said cross member, a clutch housing trunnion disposed in said opening connecting said engine and said transmission housing together, resilient mounting means interposed between said housing-trunnion and said frame cross member, said engine, transmission housing, and clutch housing being oscillatory as a unit on said resilient mounting means about the axis of the engine crankshaft by the torque thereof during engine operation, a gear shift lever mounted on said cross member extending into said housing-trunnion, gear shifter rails extending from said transmission housing into said housing-trunnion, and means on said shifter rails inwardly of said resilient mounting means operatively connecting said rails and lever together and allowing transverse relative movement between the rails and said lever.

References Cited in the file of this patent

UNITED STATES PATENTS

| Number | Name | Date |
|---|---|---|
| 1,413,133 | Purcell | Apr. 18, 1922 |
| 1,738,532 | Harbour | Dec. 10, 1929 |
| 2,034,640 | Saurer | Mar. 17, 1936 |
| 2,044,714 | Trott | June 16, 1936 |
| 2,052,009 | Woolson | Aug. 25, 1936 |
| 2,236,408 | Klavik | Mar. 25, 1941 |
| 2,377,006 | Heinemann et al. | May 29, 1945 |